(12) United States Patent
Wood (10) Patent No.: US 11,040,897 B2
(45) Date of Patent: Jun. 22, 2021

(54) SYSTEM AND METHOD FOR CAPACITIVE DEIONIZATION OF A FLUID

(71) Applicant: Ecolab USA Inc., St. Paul, MN (US)

(72) Inventor: Kyle Wood, Eagan, MN (US)

(73) Assignee: Ecolab USA Inc., Saint Paul, MN (US)

(*) Notice: Subject to any disclaimer, the term of this patent is extended or adjusted under 35 U.S.C. 154(b) by 285 days.

(21) Appl. No.: 15/059,968

(22) Filed: Mar. 3, 2016

(65) Prior Publication Data
US 2016/0272516 A1     Sep. 22, 2016

Related U.S. Application Data

(60) Provisional application No. 62/136,209, filed on Mar. 20, 2015.

(51) Int. Cl.
*C02F 1/469*     (2006.01)

(52) U.S. Cl.
CPC ...... *C02F 1/4691* (2013.01); *C02F 2209/005* (2013.01); *C02F 2209/05* (2013.01); *C02F 2209/42* (2013.01)

(58) Field of Classification Search
CPC ........................... C02F 1/46104; C02F 1/4691
See application file for complete search history.

(56) References Cited

U.S. PATENT DOCUMENTS

| | | | | |
|---|---|---|---|---|
| 5,057,202 A | * | 10/1991 | Maitino | ............... C02F 1/46114 204/212 |
| 6,309,532 B1 | * | 10/2001 | Tran | ........................ B01J 47/08 204/267 |
| 6,365,023 B1 | * | 4/2002 | De Los Reyes | ....... B01D 61/48 204/524 |
| 6,462,935 B1 | | 10/2002 | Shiue et al. | |
| 6,569,298 B2 | | 5/2003 | Mrida-Donis | |
| 6,726,822 B2 | * | 4/2004 | Garcia | ................... B01D 61/48 204/519 |

(Continued)

FOREIGN PATENT DOCUMENTS

| | | |
|---|---|---|
| CA | 2828788 A1 | 9/2012 |
| CN | 1863737 A | 11/2006 |

(Continued)

OTHER PUBLICATIONS

International Search Report for International Application No. PCT/US2016/020535; dated Jul. 14, 2016; 4 pages.

(Continued)

*Primary Examiner* — Brian W Cohen
(74) *Attorney, Agent, or Firm* — Fredrikson & Byron, P.A.

(57) ABSTRACT

Aspects of the disclosure are directed toward systems and methods for performing deionization of a fluid. A capacitive deionization (CapDI) module including a fluid inlet and a fluid outlet can be placed in a fluid flow system. The CapDI module can include a plurality of CapDI cells arranged in series with one another. A power MOSFET polarity circuit can receive power from a switching regular and provide bidirectional electrical power to the CapDI module for performing deionization and module regeneration processes. A controller can control the providing the electrical power from the switching regulator to the power MOSFET polarity circuit based on a signal received from a conductivity sensor positioned in the fluid flow path.

12 Claims, 6 Drawing Sheets

(56) References Cited

U.S. PATENT DOCUMENTS

| | | | |
|---|---|---|---|
| 7,033,481 B1 | 4/2006 | Schlager et al. | |
| 7,481,929 B2 | 1/2009 | Wilkins et al. | |
| 8,557,098 B2 | 10/2013 | Kim et al. | |
| 8,658,043 B2 | 2/2014 | Jha et al. | |
| 2004/0121204 A1 | 6/2004 | Adelman et al. | |
| 2005/0103622 A1 | 5/2005 | Jha et al. | |
| 2005/0173262 A1* | 8/2005 | Nakanishi | C02F 1/46104 205/743 |
| 2009/0045048 A1 | 2/2009 | Bourcier et al. | |
| 2009/0045074 A1 | 2/2009 | Hoover et al. | |
| 2009/0127119 A1* | 5/2009 | Witte | C02F 1/008 204/662 |
| 2013/0118918 A1 | 5/2013 | Servida | |
| 2013/0342028 A1 | 12/2013 | Hermann et al. | |
| 2014/0083846 A1 | 3/2014 | Moon et al. | |
| 2014/0346046 A1 | 11/2014 | Andelman | |
| 2015/0027890 A1 | 1/2015 | Jha et al. | |
| 2015/0166373 A1* | 6/2015 | Landon | C02F 1/4691 204/555 |
| 2015/0298999 A1 | 10/2015 | Smith et al. | |
| 2016/0010222 A1 | 1/2016 | Jha et al. | |
| 2018/0022622 A1 | 1/2018 | Voss et al. | |

FOREIGN PATENT DOCUMENTS

| | | | |
|---|---|---|---|
| JP | 2010058012 A | 3/2010 | |
| WO | 2011121436 A1 | 10/2011 | |
| WO | 2012125637 A2 | 9/2012 | |
| WO | 2013063567 A2 | 5/2013 | |
| WO | WO-2014014858 A2 * | 1/2014 | ......... A47L 15/0044 |
| WO | 2014076557 A1 | 5/2014 | |
| WO | 2015038715 A1 | 3/2015 | |
| WO | 2015196056 A1 | 12/2015 | |

OTHER PUBLICATIONS

Notification of Transmittal of International Search Report for International Application No. PCT/US2016/020535; dated Jul. 14, 2016; 1 page.

Written Opinion for International Application No. PCT/US2016/020535; dated Jul. 14, 2016; 5 pages.

Balouch, "Design of Test Loops for Forced Convection Heat Transfer Studies at Supercritical State," Thesis submitted to the Faculty of Graduate Studies and Research at Ottawa-Carleton Institute for Mechanical and Aerospace Engineering, Aug. 2011, 341 pages.

Daigle, "Ultra Deep Water Discharge of Produced Water and/or Solids at the Seabed," Fluor Offshore Solutions, sponsored by the Research Partnership to Secure Energy for America, Apr. 24, 2012, 460 pages.

European Patent Application No. 16769293.8, Extended European Search Report dated Sep. 20, 2018, 9 pages.

Cai, "Sensor and Detection Technique Application," Metallurgical Industry Press, Feb. 2013, pp. 138-139, with partial English Translation.

Cai, "Small and Medium-Sized Hydraulic Turbines: The Principle Debugging and Fault Analysis of Speed Governor," China Electric Power Press, Jun. 2006, pp. 115-117, with partial English Translation.

Jiayou, "Electronic technology—Quick learning and use," Fujian Science and Technology Press, May 2009, pp. 333-337, with partial English Translation.

\* cited by examiner

SYSTEM AND METHOD FOR CAPACITIVE DEIONIZATION OF A FLUID

BACKGROUND

Capacitive deionization (CapDI) systems are known in the art. In general, a fluid is passed between two capacitive plates or electrodes held at an electrical potential. The electrical potential causes ions in the fluid to migrate toward the electrode of opposite charge, where they can be trapped in a porous material and removed from the fluid. In some cases, the electrodes themselves comprise a porous material and trap ions that are attracted thereto. CapDI systems can include a plurality of CapDI cells (sets of electrodes and/or porous layers) to form a CapDI module which receives incident fluid and can expel deionized fluid.

Exemplary cells require approximately 1.5 volts and 15 amps of electrical power applied thereacross for capacitive deionization functionality. In many CapDI systems, a CapDI module includes a plurality of CapDI cells electrically arranged in a parallel configuration. Providing electrical power to such a module comprises applying the same voltage across each cell, while separately directing current through each cell. In an exemplary six cell parallel configuration, the module would require only 1.5 volts, but up to 90 amps of current to operate. Additionally, over time, the CapDI module continues to trap ions from the fluid flowing therethrough. Thus, many systems require an ability to expel the trapped ions from the CapDI module as the module becomes saturated with ions.

The high current demand and regeneration processes necessary of such systems often require large control and power supply systems in addition to the CapDI module to effectively operate a CapDI system. As such, it can be difficult and problematic to incorporate a CapDI system into a space-limited application, such as into a standalone piece of equipment in order to provide deionized fluid thereto.

SUMMARY

Aspects of the disclosure are generally directed toward systems and methods for deionization of a fluid. Exemplary systems include a capacitive deionization (CapDI) module positioned in a fluid flow system and configured to deionize the fluid flowing therethrough. The CapDI module can include a plurality of CapDI cells arranged in series with one another. Thus, the plurality of cells can be powered using comparatively low current when compared to cells arranged in parallel as discussed above.

Systems can include a power MOSFET polarity circuit, such as a solid state H-bridge circuit, configured to provide bidirectional electrical power to the CapDI module. In various embodiments, the power MOSFET polarity circuit can be adjusted in order to change the polarity of electoral power provided to the CapDI module. A switching regulator can be configured to provide power to the power MOSFET polarity circuit. In some examples, a controller is configured to control the providing of the electrical power from the switching regulator to the power MOSFET polarity circuit. The controller can be in communication with a sensor, such as a conductivity sensor, and can control the providing of electrical power to the MOSFET polarity circuit based on communication between the controller and the sensor.

In some embodiments, the controller can compare a conductivity measured using a conductivity sensor to a conductivity threshold. In some such embodiments, in the condition that the detected conductivity exceeds the threshold, the controller can act to increase the electrical power applied from the switching regulator to the power MOSFET polarity circuit. In still further examples, if the detected conductivity is lower than the threshold, the controller can act to decrease the electrical power applied to the power MOSFET polarity circuit. In some such examples, the controller acts to adjust the power applied to the power MOSFET polarity circuit by adjusting an electrical potential applied to the switching regulator.

In some examples, systems can include a first valve coupled between the CapDI module and a use device and a second valve coupled between the CapDI module and a drain. In some such examples, during use, electrical power can be applied to the CapDI module from the power MOSFET polarity circuit at a first polarity while the first valve permits the flow of fluid to the use device. Applying power at the first polarity can cause the CapDI module to electrically capture ions from the fluid, thereby creating a deionized fluid to flow toward the use device. During an exemplary process, the first valve can be closed to prevent fluid from flowing from the CapDI module to the use device and the second valve can be opened to allow fluid to flow from the CapDI module to the drain. The power MOSFET polarity circuit can be adjusted to apply electrical power in a second polarity opposite the first to the CapDI module. Such an exemplary process can be performed in response to a detected regeneration condition.

DETAILED DESCRIPTION

The following detailed description is exemplary in nature and is not intended to limit the scope, applicability, or configuration of the invention in any way. Rather, the following description provides some practical illustrations for implementing various embodiments of the present invention. Unless otherwise noted, illustrations of various aspects of the disclosure are not necessarily drawn to scale. Examples of constructions, materials, dimensions, and manufacturing processes are provided for selected elements, and all other elements employ that which is known to those of ordinary skill in the field of the invention. Those skilled in the art will recognize that many of the noted examples have a variety of suitable alternatives.

Figure 1:
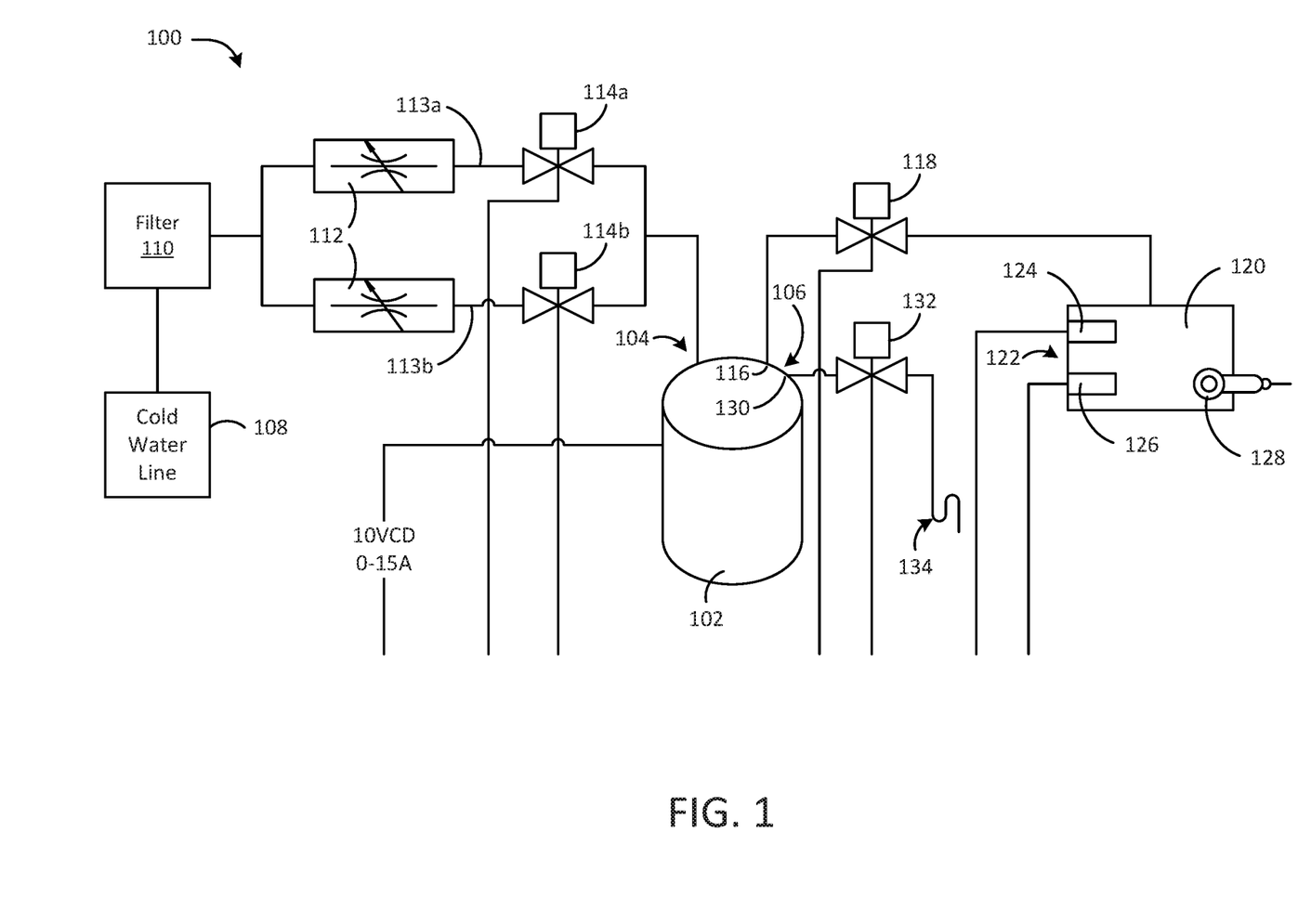
FIG. 1 is a schematic diagram of an exemplary CapDI system according to some embodiments.

FIG. 1 is a schematic diagram of an exemplary CapDI system according to some embodiments. FIG. 1 shows a representation of an exemplary CapDI system 100 including CapDI module 102 having a fluid inlet 104 and a fluid outlet 106. In the illustrated embodiment, the CapDI module 102 receives fluid from a cold water line 108 via the fluid inlet 104. In general, the fluid inlet 104 can receive fluid from any source appropriate for the desired use of the fluid. In the illustrated embodiments, the CapDI module 102 is incorporated into a system comprising various components such as a filter 110, a parallel arrangement of flow restrictors 112, and valves 114a, 114b located in parallel lines 113a, 113b, respectively. In some systems, a plurality of lines such as 113a and 113b can be selectively placed in fluid communication with the fluid inlet 104 of the CapDI module 102 for various operations and/or procedures using the module 102. Valves 114a, 114b, such as solenoid valves, for example, can be incorporated into one or more such lines in order to selectively couple the lines to the module 102 and control fluid flow rate, for example. In general, any number of various components can be placed in line prior to the fluid inlet 104 of the CapDI module 102 in order to prepare the fluid for its intended use. The CapDI module 102 receives and performs a deionization process on the fluid.

The fluid outlet 106 of the CapDI module 102 is shown comprising two outlet ports 116, 130. In some systems, fluid from the CapDI module can be directed to a use device for using the deionized fluid or to a drain. Use devices can include, for example, a dishmachine, a cooling tower, water softening applications, or others. In some embodiments, the use device receives and utilized fluid directly from the CapDI module 102, while in other embodiments, the CapDI system 100 is configured to deionize fluid via the CapDI module 102 and direct deionized fluid to a fluid reservoir 120 for future use. The CapDI module can comprise a plurality of outlet ports, such as in the embodiment shown in FIG. 1, for directing fluid to one of a plurality of possible destinations. In some such embodiments, the CapDI module 102 can include a system of one or more valves or other fluid diverters therein for directing fluid as desired. In some configurations, a CapDI system includes a series of one or more external valves coupled to one or more outlet ports of the CapDI module 102 to control the destination of fluid coming from the outlet ports. These valves can include any appropriate type of valve for controlling fluid flow, such as solenoids, 3-way valves, and other flow limiting devices.

In the illustrated embodiment, the first outlet port 116 of the CapDI module 102 is in fluid communication with a first solenoid valve 118 and a fluid reservoir 120 for a use device. The fluid reservoir 120 can comprise a fluid level detector 122, represented in the illustrated embodiment a high float 124 and a low float 126, for determining information regarding the amount of deionized fluid in the fluid reservoir 120. Any appropriate detector for detecting information about the amount of fluid in the fluid reservoir 120 or use device can be used. In some embodiments, the fluid reservoir 120 or other portion of the fluid line directing fluid toward the use device can include a conductivity sensor 128 for determining the conductivity of the fluid. Conductivity sensor can be used to provide information regarding the remaining ionization in the fluid after passing through the CapDI module 102. In various embodiments, other appropriate sensors can be used, such as an optical sensor, a temperature sensor, a flow meter, pH sensor, a total dissolved solid (TDS) sensor, and the like. The second outlet port 130 is shown in fluid communication with a second solenoid valve 132 and a drain 134.

From a system level, the CapDI module 102 can deionize a fluid for use with the use device. Fluid from a source such as a cold water line 108 can be directed through various components such as a filter 110 to the CapDI module 102, which can act to deionize the incident fluid. The deionized fluid can be directed toward a use device which can include a fluid reservoir 120 and a fluid level detector 122. Alternatively, the fluid from the CapDI module 102 can be directed toward a drain 134. The direction of the fluid from the CapDI module 102 can be dictated by valves 118 and 132.

The CapDI module 102 acts to deionize a fluid by way of electrically removing ions therefrom. In general, an electric charge is applied between capacitive surfaces between which fluid flows. The applied charge creates an electric field that causes ions to migrate toward one charged surface or the other, where they can be trapped in the capacitive surface or a separate surface designed for trapping ions. In some embodiments, the separate surface is designed for trapping only one polarity of ions, while being impermeable to the other.

Figure 2A:
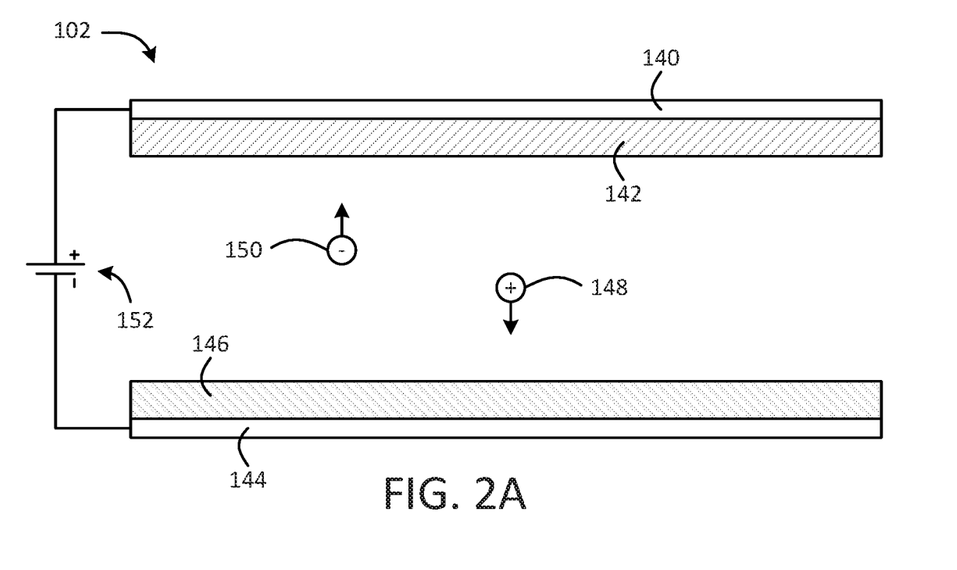
FIGS. 2A and 2B are exemplary diagrams of a basic CapDI configuration such as may be used in a CapDI module.
Figure 2B:
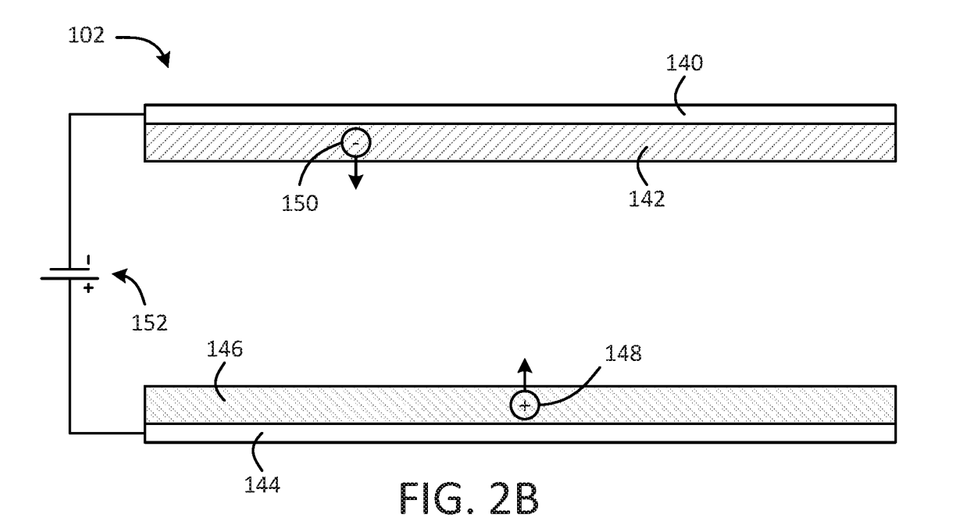

FIGS. 2A and 2B are exemplary diagrams of a basic CapDI configuration such as may be used in a CapDI module. In the illustrated embodiment, a charge is provided to opposing capacitive surfaces 140 and 144 from a source 152. Source 152 is shown as being a DC source, however, in various embodiments, more complicated power source arrangements can be used. In the illustrated example, a first capacitive surface 140 is held at a positive charge with respect to a second capacitive surface 144. When the charge is applied across the surfaces, a negatively charged ion 150 in a fluid therebetween will migrate toward the first capacitive surface 140 (the more positive surface), while a positively charged ion 148 in the fluid will migrate toward the second capacitive surface 144 (the more negative surface), as illustrated by the arrows in FIG. 2A.

In some embodiments, first 140 and/or second 144 capacitive surfaces comprise a porous material for trapping ions 148, 150 therein. In alternative embodiments, first 140 and second 144 capacitive surfaces comprise a first 142 and second 146 porous layer, respectively, for trapping ions attracted to the respective capacitive surfaces. In some embodiments, the surface for trapping ions comprises a membrane that selectively allows ions with charge of a certain polarity to pass therethrough. As charge (i.e., ions) migrates through the fluid to respective capacitive surfaces, current flows through the fluid. Accordingly, current flowing to/through the capacitive surfaces and the CapDI module 102 is indicative of the number of ions being removed from the fluid.

Over time and with use, the components of the CapDI module that trap ions therein (e.g., porous capacitive surfaces 140, 144 or other porous layers 142, 146) can become saturated with ions. Accordingly, it can be desirable to be able to rid such components of ions in order to regenerate the CapDI module 102. For example, with reference to FIG. 2B, if the polarity of the power source 152 were reversed, a negative ion 150 trapped in, for example, the first porous layer 142 will be repelled away from the first capacitive surface 140 (the more negative surface) and into the fluid, while a positive ion 148 trapped in, for example, the second porous layer 146 will be repelled away from the second capacitive surface 144 (the more positive surface) and into the fluid. If the first 142 and second 146 porous layers comprise selective membranes as mentioned, ions repelled into the fluid cannot simply be trapped in the opposite porous layer, but rather stay in the fluid. Thus, if fluid is flushed through the CapDI module 102, previously trapped ions will be flushed from the module 102, creating room for the further deionization of fluid. Thus, the CapDI module 102 comprises at least two modes of operation—a purification mode in which ions are removed from the fluid and trapped in either capacitive surfaces or other porous layer, and a regeneration mode, in which trapped ions are flushed from the CapDI module 102.

As shown in FIGS. 2A and 2B, the exemplary CapDI system 100 includes a source of electric power to the CapDI module 102 to effectively capture ions from a fluid flowing therethrough. As such, with reference back to FIG. 1, the CapDI system 100 includes a power supply line 136 for providing electrical power to the CapDI module 102. Power supply line 136 can provide a specified amount of voltage and/or current to the CapDI module 102. In some embodiments, the CapDI module 102 operates at approximately 10 VDC and between approximately zero and 15 amps of current.

In some embodiments, the CapDI module 102 comprises a plurality of CapDI cells, each comprising electrodes and possibly porous surfaces such as shown in FIGS. 2A and 2B. CapDI cells can be arranged electrically in series or in parallel to form a CapDI module. In an exemplary embodiment, a CapDI module comprises six CapDI cells, each with an operating voltage of approximately 1.5 VDC and an operating current of up to 15 A. When arranged in parallel, the CapDI module as a whole can operate at 1.5 VDC (applied across each CapDI cell in parallel), but can requires up to 6×15=90 A to operate at full capacity. However, a CapDI module comprising the same cells arranged in series can operate at 6×1.5=9 VDC but with a maximum operating current of only 15 A. Accordingly, in some embodiments, CapDI cells are arranged in series to construct a CapDI module to reduce the amount of current required to operate the CapDI system.

Figure 3:
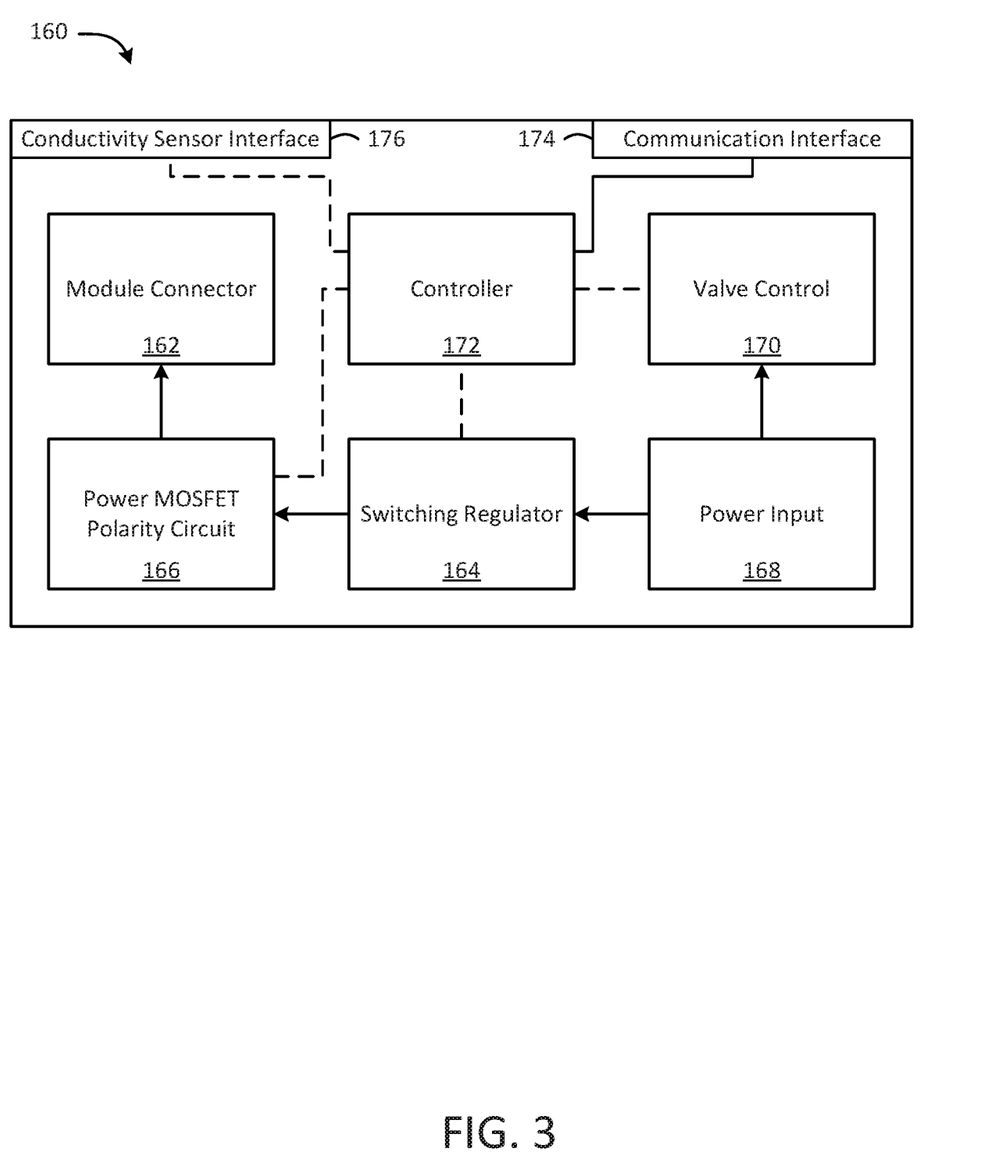
FIG. 3 is a schematic diagram of an exemplary control board for use with some embodiments of the invention.

In some embodiments, the CapDI system can include a control board for controlling various aspects of the CapDI system and providing electrical power to the CapDI module. FIG. 3 is a schematic diagram of an exemplary control board for use with some embodiments of the invention. In the illustrated embodiment, the control board 160 comprises module connector 162 for electrically coupling the CapDI module 102 to the control board 160. The board 160 further includes a switching regulator 164 and a power MOSFET polarity circuit 166 connected to the module connector 162. During operation of the CapDI system, the switching regulator 164 can provide electrical power to the CapDI module 102 via the power MOSFET polarity circuit 166 and the module connector 162.

The switching regulator 164 can act to regulate the voltage applied to the CapDI module 102. In some embodiments, a certain voltage (e.g., 24 VDC) is applied at a single power input 168 to the control board 160. However, such a voltage may be inappropriate for all uses on the board or system. For example, in some configurations, the CapDI module 102 is configured to operate at 10 VDC. In such an embodiment, the switching regulator 164 can be configured to receive power from the single power input 168 and provide a regulated output of approximately 10 VDC to the CapDI module 102 via the power MOSFET polarity circuit 166 and the module connector 162. The switching regulator 164 can additionally source current to the CapDI module 102 as ions are trapped in the porous layers 142, 146 or capacitive surfaces 140, 144. In some embodiments, the switching regulator 164 is adjustable, in that the switching regulator can receive an input corresponding to in output current limit. That is, the switching regulator 164 can limit the current output to the power MOSFET polarity circuit 166 based on a received input signal. Exemplary switching regulators can comprise 150 W adjustable switching regulators.

The power MOSFET polarity circuit 166 can include one or more MOSFETS, and be configured to receive electrical power from the switching regulator 164 and direct it to the CapDI module 102 via the module connector 162. The power MOSFET polarity circuit 166 can further output the power to the module connector 162 in either of a first or a second polarity. Thus, the power MOSFET polarity circuit 166 is configured to enable purification mode or regeneration mode of the CapDI system 100 while receiving electrical power from the switching regulator 164 in only a single polarity. Accordingly, the switching regulator 164 need only supply electrical power in a single direction. In some examples, power MOSFET polarity circuit 166 comprises a plurality of power MOSFET devices arranged in an H-bridge configuration for bidirectional operation of the CapDI module 102.

The control board 160 of FIG. 3 further includes a valve control mechanism 170 for controlling valves in the CapDI system 100. For example, valve control mechanism 170 can be configured to interface with any or all of valves 114a, 114b, 118 and 132 of the CapDI system 100 shown in FIG. 1 to direct fluid in a desired manner. In some examples, any or all of valves 114a, 114b, 118 and 132 comprise solenoid valves, or other electrically actuated valves. In such embodiments, valve control mechanism 170 can selectively provide electrical power to the valves. Valve control mechanism 170 can be electrically coupled to power input 168 for receiving power to direct toward appropriate valves in the CapDI system 100.

In some embodiments, components on the control board 160, and resultantly other components of the CapDI system 100, can be controlled by a controller 172, which can be included on the control board 160. Controller can include, for example, a microcontroller or other device capable of receiving signals and outputting signals based on the received signals. In some configurations, controller 172 is sized such that it can be positioned on a control board 160. In some embodiments, controller 172 can be in communication with several components of the control board 160. For example, the controller can be in communication with valve control mechanism 170 in order to control the opening and closing of valves at various times during operation of the CapDI system 100. In some configurations, the controller can be in communication with the fluid level detector 122 in a fluid reservoir 120 in a use device. Accordingly, the controller 172 can receive information regarding the level of fluid in the fluid reservoir 120 and control valves to direct fluid through the CapDI system 100 to the reservoir 120 if necessary.

In some examples, controller 172 can be in communication with the power MOSFET polarity circuit 166 to define the polarity of power applied to the CapDI module 102 from the switching regulator 164. For example, in the case of an H-bridge power MOSFET configuration, controller 172 can act to "turn on" or "turn off" various MOSFETs in the power MOSFET polarity circuit 166 to define the polarity of the electrical power delivered to the CapDI module 102. In some embodiments, controller 172 can output a voltage in order to affect the power transmission through the MOSFETs in the power MOSFET polarity circuit 166. Controller 172 can provide appropriate voltages to control various MOSFETs in response to a received signal. Such a signal can be initiated, for example, by a sensor, timer, user interface, or any other component appropriate for providing a signal to the controller 172.

For example, in some configurations, controller 172 can receive signals from a sensor, timer, controller or other system component indicative of the desired mode of operation for the CapDI module. If the module 102 is to be operated in purification mode (to deionize a fluid), the controller 172 can apply appropriate voltage to the power MOSFET polarity circuit 166 to direct electrical power in a first polarity from the switching regulator 164 to the module 102. If the module is to be operated in regeneration mode, the controller 172 can apply an appropriate voltage to the power MOSFET polarity circuit 166 to direct electrical power in a second polarity, opposite the first, from the switching regulator 164 to the CapDI module 102. In some examples, applying appropriate voltage to the power MOSFET polarity circuit 166 for purification comprises "turning on" a first pair of MOSFETs while "turning off" a second pair to allow the flow of electricity in one direction through the CapDI module 102. In such examples, applying appropriate voltage to the power MOSFET polarity circuit 166 for regeneration comprises "turning off" the first pair of MOSFETs while "turning on" the second pair, allowing electricity to flow in the opposite direction through the module 102.

In some embodiments, the controller 172 can be in communication with the conductivity sensor 128 or other appropriate sensor within the system and receive signals indicative of the number of ions in the fluid after deionization in the CapDI module 102. For instance, in some examples, the control board 160 includes an integrated conductivity sensor interface 176. The conductivity sensor interface 176 can be in communication with the controller 172, and can act to provide communication between the controller 172 and the conductivity sensor 128. The conductivity sensor 128 can provide information to the controller 172 regarding the conductivity of the fluid, which can be indicative of the remaining ion content in the fluid. Accordingly, in some embodiments, the conductivity sensor in combination with the conductivity sensor interface can provide a closed loop feedback to the controller regarding the operation of the CapDI module.

In some embodiments, the controller 172 can signal the switching regulator 164 to adjust the current flow or current limit through the CapDI module in order to adjust the number of ions being removed in the deionization process. In some examples, the current limit provided from the switching regulator 164 is determined by an input voltage thereto. Thus, in some examples, the controller 172 can apply a voltage to the switching regulator 164 in order to allow current to flow therefrom, and can adjust the voltage applied thereto to adjust the current allowed to flow from the switching regulator 164 to the CapDI module 102. In some examples, the controller 172 adjusts the current allowed to flow from the switching regulator 164 to the CapDI module in response to signals from the closed loop feedback provided by the conductivity sensor and the integrated conductivity sensor interface.

As has been so far described, the controller 172 can communicate with various sensors and other components in the CapDI system 100 and on the control board 160. In some embodiments, the controller 172 is configured to perform methods in response to various parameters sensed by sensors in the system. Such methods can be, for example, embodied on a non-transitory computer-readable medium embedded in or in communication with the controller 172, which can process and carry out instructions according to such methods.

The control board 160 of the CapDI system can further include a communication interface 174 for communicating with an external device, such as a computer or external controller. The communication interface 174 can include, for example, a serial communication port, a USB communication port, a wireless communication link, or any other appropriate method of control communication. Communication interface 174 can provide a link to an external device to, for example, initiate operation of the system via the controller 172 or log system information. For example, in some configurations, controller 172 receives a command from an external device via communication interface 174 to cause the controller 172 to perform an operation and to communicate data back to the external device. The external device can include a user interface to allow a user to initiate system operation via communication interface 174 and the controller 172.

Figure 4:
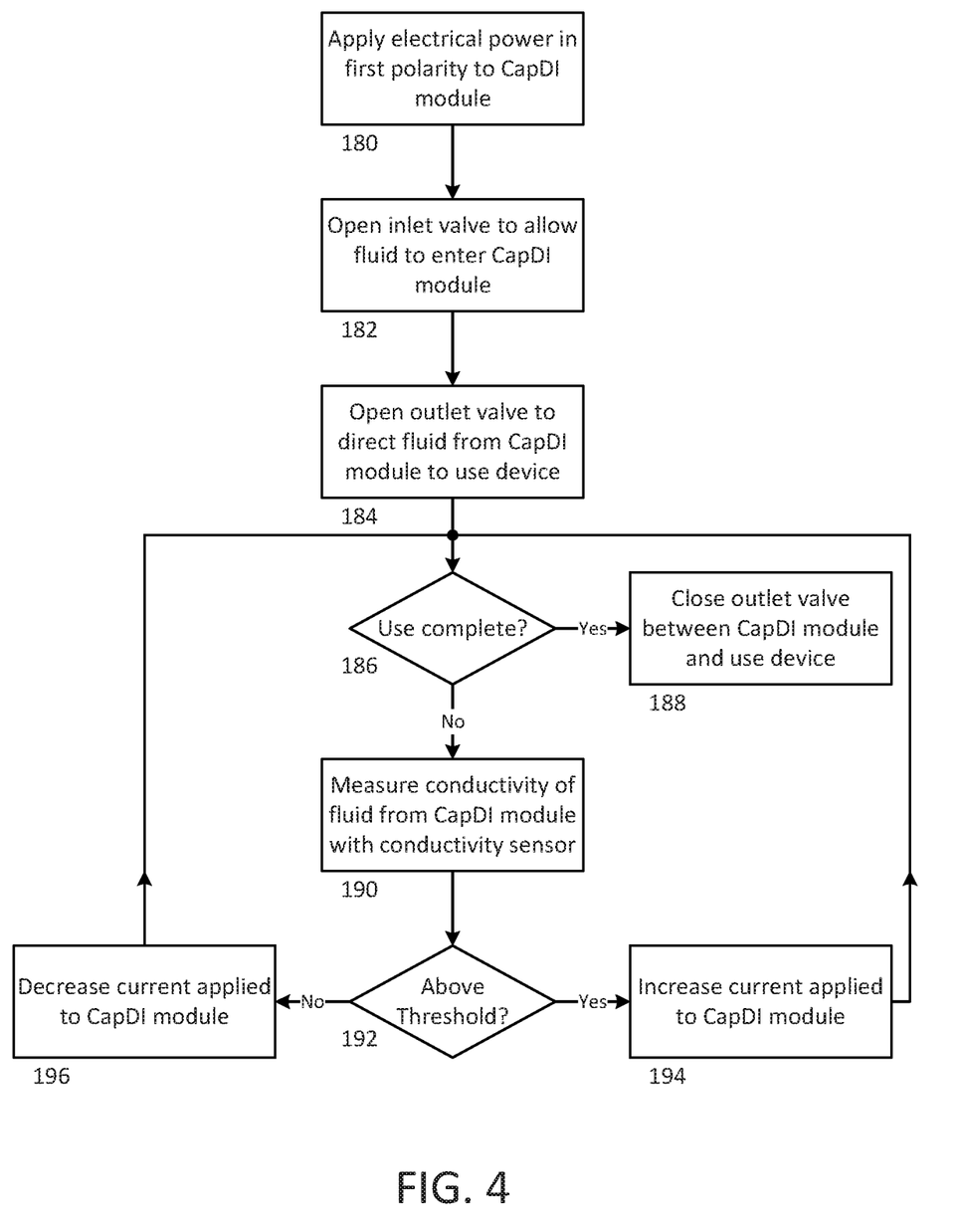
FIG. 4 is a process flow diagram illustrating exemplary operation of a CapDI system.

FIG. 4 is a process flow diagram illustrating exemplary operation of a CapDI system. In the process of FIG. 4, electrical power is applied 180 to the CapDI module in a first polarity. Applying 180 electrical power can be done, for example, by the controller outputting a voltage to the switching regulator to provide electrical power to the power MOSFET polarity circuit and thus the CapDI module. The voltage to the switching regulator from the controller can set a current limit for the output of the switching regulator. The controller can subsequently communicate with the valve control mechanism to open 182 an inlet valve to allow fluid to enter the CapDI and/or open 184 an outlet valve to direct fluid from the CapDI module to a use device, or otherwise allow fluid to flow to such a device. In some embodiments, the CapDI system need not include an inlet valve, but rather the CapDI module can receive fluid directly from a source with the prevention of flow to the use device performed by only an outlet valve. In such embodiments, opening 182 an inlet valve is not performed. In embodiments comprising an inlet valve, it should be noted that in various methods of operation, steps 182 and 184 of opening the inlet and outlet valves can be permuted.

The controller can determine if the use of the use device is complete 186. In some examples, the use device can signal the controller that the use is complete. In other embodiments, the controller can be alerted that use of the device is complete via a user interface. If the use is complete, the controller can close 188 the outlet valve between the CapDI module and the use device, and operation can be stopped. If the use is not complete, then the controller can measure or detect 190 the conductivity of the fluid from the CapDI module with the conductivity sensor and compare 192 the measured conductivity with a threshold value.

In general, a more conductive fluid (i.e., a higher measured conductivity) has a higher concentration of ions in the fluid when compared to a less conductive fluid. Thus, when a measured conductivity is above the threshold, it can be interpreted that there is a higher concentration of ions remaining in the fluid than desired, and the controller can increase 194 the current applied to the CapDI module. As discussed, increasing the current to the CapDI module can result in the removal of more ions from the fluid. Increasing the current can include, for example, increasing an applied voltage from the controller to the switching regulator. In some embodiments, if the measured conductivity is not above the threshold, the controller can act to decrease 196 the current applied to the CapDI module, thereby reducing the electrical load on the system.

After increasing 194 or decreasing 196 the current applied to the CapDI module, the controller can determined if the use of the use device is complete 186 and the same analysis is repeated until the use is complete. Thus, the controller can perform an iterative process during which the current to the CapDI module is varied in response to the measured conductivity of the sample as compared to a threshold. The threshold can be preprogrammed into the controller during factory setup, or can be set by a user via a user interface. In some examples, the threshold is adapted for a particular use or use device.

In some embodiments, additional or alternative parameters to the conductivity of the fluid, such as parameters detected by any other included sensors, can be measured and utilized in the feedback determination of increasing or decreasing the current to the CapDI module. In addition, in some embodiments, adjusting the current to the CapDI module is performed after a certain amount of time. For example, the controller may collect conductivity or other information regarding the ion content in the fluid over a length of time and calculate an average of the measured parameter before comparing the parameter to a threshold.

In some CapDI systems, fluid from the CapDI module is directed to a fluid reservoir for holding fluid for a use device. As described previously with respect to FIG. 1, a fluid reservoir 120 can include a fluid level detector 122 such as a high 124 and low float 126. In some embodiments, the system can include an upper and lower fluid threshold. For example, the lower threshold can represent a fluid level such that the use device can be used one more time before requiring the addition of fluid, while the upper fluid threshold can represent a fluid level such that the fluid reservoir 120 is full or nearly full. Thus, when the fluid is detected as being below the lower threshold, the system can initiate a fill mode in which fluid is added to the fluid reservoir 120 until the fluid level surpasses the upper threshold. In some embodiments, the fluid reservoir comprises a conductivity sensor and/or another type of sensor for measuring a parameter of the sample indicative of the ion concentration therein. Such a measurement can be used to adjust operation of the CapDI module during the fluid reservoir filling process.

Figure 5:
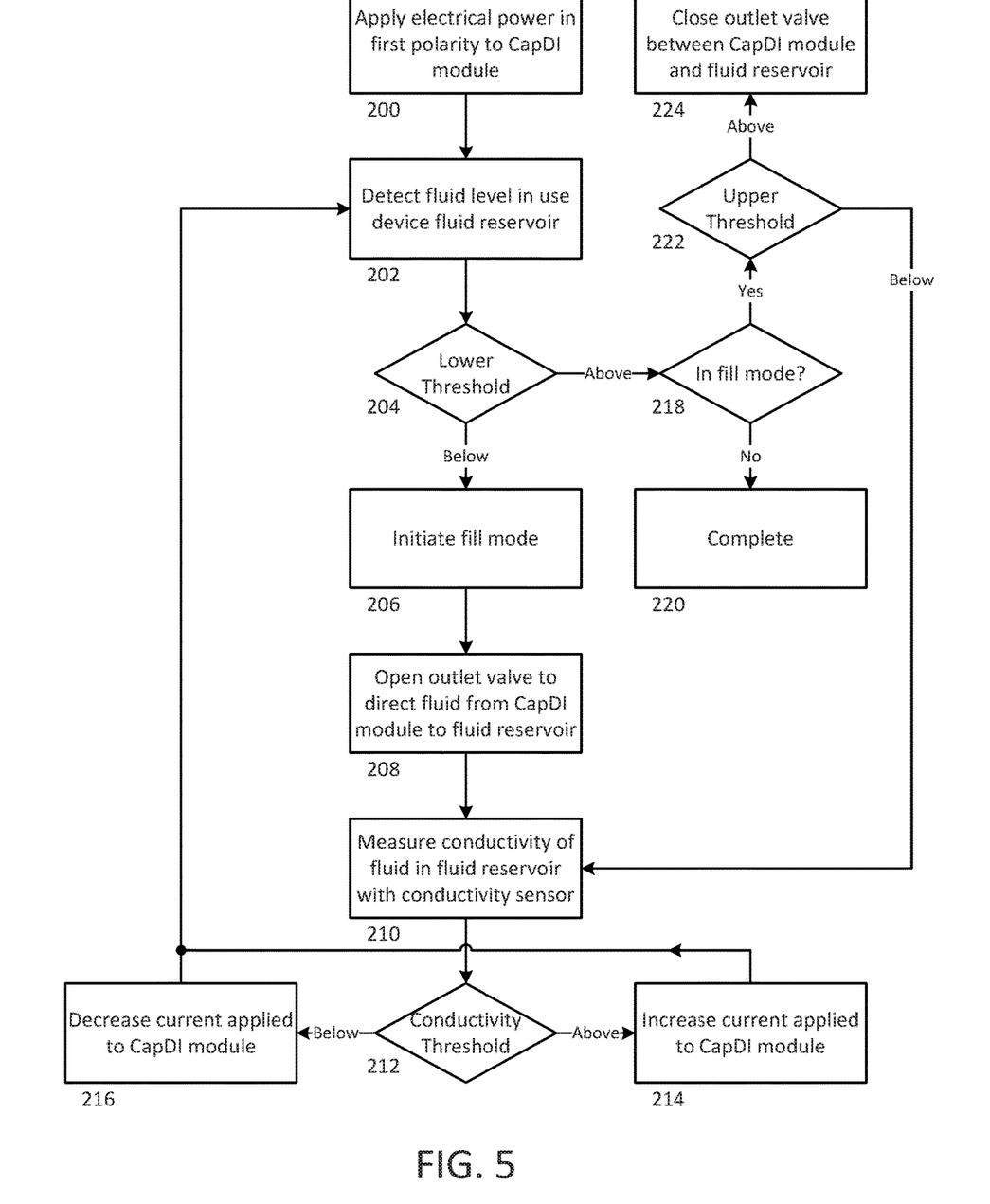
FIG. 5 is a process flow diagram illustrating exemplary operation of a CapDI system including a fluid reservoir.

FIG. 5 is a process flow diagram illustrating exemplary operation of a CapDI system including a fluid reservoir. The process outlined in FIG. 5 can be performed, for example, by the controller. In the illustrated embodiment, the controller can apply 200 electrical power in a first polarity to the CapDI module. Applying electrical power can be done, for example, via the switching regulator, power MOSFET polarity circuit and module connector as described above. The controller can detect 202 the fluid level in the fluid reservoir via, for example, the fluid level detector, and compare 204 the detected level to the lower threshold. If the level is detected as being below the lower threshold, the controller can initiate 206 a fill mode in which deionized fluid is added to the fluid reservoir. In some embodiments, initiating 206 fill mode can include, for example, opening an inlet valve to allow fluid to enter the CapDI module. In other embodiments, the controller can open 208 an outlet valve to direct fluid from the CapDI module into the fluid reservoir to initiate 206 fill mode or after initiating 206 fill mode.

Using the conductivity sensor, the controller can measure 210 the conductivity of the fluid in the fluid reservoir and compare 212 to a conductivity threshold similarly to as described with respect to FIG. 4. If the measured conductivity is above the threshold, the controller can increase 214 the current applied to the CapDI module, while if the measured conductivity is below the threshold, the controller can decrease 216 the current. After adjusting the current, the controller can once again detect 202 the fluid level in the reservoir and compare 204 the level to the lower threshold.

If the detected fluid level is above the lower threshold, the controller can determine 218 if the system is in fill mode. If the system is in fill mode, the controller can compare 222 the fluid level to the upper threshold. If the fluid level is below the upper threshold, the fill process is not complete and the conductivity feedback sequence can be performed, including measuring 210 the conductivity, comparing 210 the conductivity to a threshold, and increasing 214 or decreasing 216 the current applied to the CapDI module. However, if the measured fluid level is above the upper threshold, the controller can close 224 the valve between the CapDI module and the fluid reservoir, as the fill process is complete.

If it is determined at 218 that the system is not in fill mode, then fill mode has not been initiated and the fluid level was not determined to be below the lower threshold. Accordingly, filling of the reservoir is not required and the fluid level determination and adjustment process is complete 220. In such a situation, electrical power can be removed from the CapDI module. In general, if the detected fluid level is between the lower and upper thresholds, the outlet valve remains in its present state. That is, if the system is in fill mode, the valve between the CapDI module and the fluid reservoir is already open and remains open, since the fluid level has not yet surpassed the upper threshold. However, if the system is not in fill mode, then there is no immediate need to open the valve to fill the fluid reservoir. It should be noted that in some embodiments, power need not be applied to the CapDI module until after fill mode is initiated.

Figure 6:
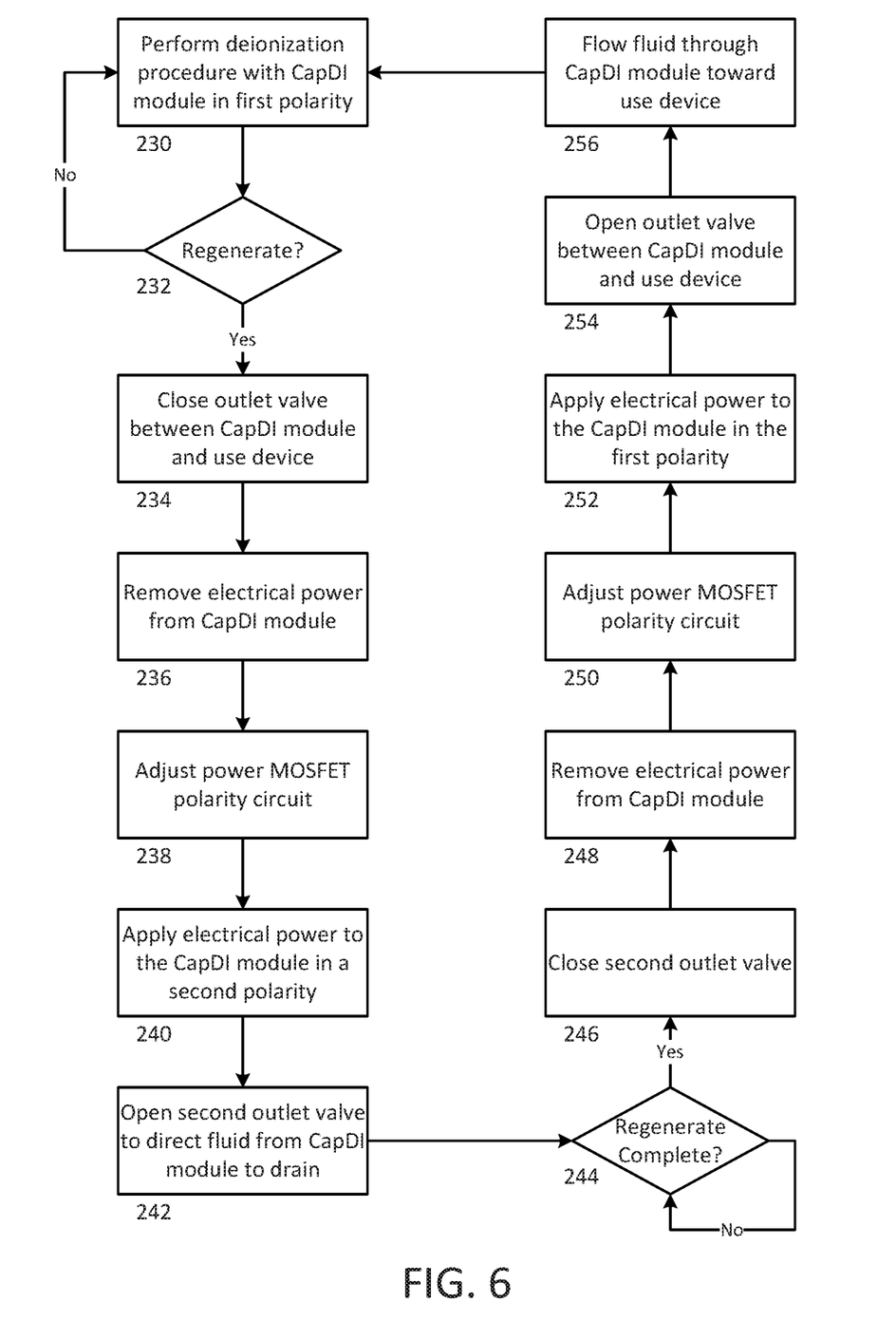
FIG. 6 is a process flow diagram illustrating exemplary regeneration of a CapDI system.

As discussed, over time, the CapDI module can become saturated with ions and become less effective at removing additional ions from a fluid flowing therethrough. Accordingly, the system can operate in regeneration mode to remove the trapped ions from the CapDI module. FIG. 6 is a process flow diagram illustrating exemplary regeneration of a CapDI system. The process steps of FIG. 6 can be performed, for example, by the controller during a regeneration of the system. After performing 230 one or more deionization procedures with a CapDI module in a first polarity, the controller can determine 232 if the module needs to be regenerated. In some embodiments, the controller is configured to regenerate the module in response to any number of detected regeneration conditions, such as: a certain amount of time has passed since a most recent regeneration, a certain number of deionization procedures have been performed, a certain volume of fluid has been run through the CapDI module since the most recent regeneration, the current limit applied to the switching capacitors has reached a predetermined level (e.g., it requires a sufficiently high predetermined amount of current to effect the desired deionization operation), or the conductivity sensor (or other sensor indicative of ionic content of the fluid) responds insufficiently to applied and/or increased electrical power applied to the CapDI module. In some instances, a regeneration procedure can be initiated at any time via a user interface.

If it is determined at 232 that regeneration is not needed, the system can continue to perform deionization procedures as usual. If regeneration is required, the controller can close 234 the outlet valve between the CapDI module and the use device if it is open, preventing the trapped ions from being directed to the use device during the regeneration procedure. The electrical power can be removed 236 from the CapDI module, and the power MOSFET polarity circuit can be adjusted 238. Adjusting 238 the power MOSFET polarity circuit can include applying power to different MOSFETs within the power MOSFET polarity circuit, for example. In some embodiments, the power MOSFET polarity circuit comprises an H-bridge circuit, and adjusting 238 the power MOSFET polarity circuit comprises "turning off" previously conducting MOSFETs and "turning on" alternate MOSFETs such that current is allowed to flow through the adjusted power MOSFET polarity circuit and through the CapDI module in an opposite direction when compared to the deionization procedure of step 230.

After adjusting 238 the power MOSFET polarity circuit, the controller can act to apply 240 electrical power to the CapDI module in a second polarity. Power can be supplied from the switching regulator, through the (adjusted) power MOSFET polarity circuit, and to the CapDI module via the module connector. For regeneration, in some embodiments, the second polarity is opposite the first. When electrical power of the second polarity is applied, ions trapped in the CapDI module are expelled into the fluid in the module. After applying 240 electrical power to the CapDI module in the second polarity, the controller can act to open 242 a second outlet valve to direct fluid from the CapDI module to a drain, such that the ions expelled into the fluid are removed from the system via the drain.

The controller can determine 244 if the regeneration is complete. Determining the completion of regeneration can be done in any number of ways. For example, the controller can determine regeneration is complete after flowing fluid through the CapDI module to the drain for a predetermined amount of time, or after a predetermined volume of fluid has been directed to the drain. If the controller determines that regeneration is not complete, regeneration continues. If regeneration is complete, the controller can act to close 246 the second outlet valve, remove 248 electrical power from the CapDI module, and adjust 250 the power MOSFET polarity circuit. Similar to step 238, adjusting the power MOSFET polarity circuit at step 250 can include applying power to different MOSFETs within the power MOSFET polarity circuit, for example. After adjusting the power MOSFET polarity circuit, the controller can apply electrical power 252 to the CapDI module in the first polarity, open 254 the outlet valve between the CapDI module and the use device, and flow 256 fluid through the CapDI module toward the use device in order to perform 230 the deionization procedure.

The procedure of FIG. 6 begins with a system operating with an inline CapDI module, directing deionized fluid towards a use device. When regeneration is needed, a variety of valves are opened and closed, polarity of power applied to the CapDI module is reversed, and the regeneration fluid is directed toward the drain. Once regeneration is complete, essentially the process happens in reverse, in which valves are closed and opened, the polarity of power applied to the CapDI module is reversed again to the first polarity, and fluid is directed through the regenerated CapDI module and toward the use device. In some embodiments, the controller can determine when regeneration is needed, and when regeneration is complete, as well as control the states of a variety of valves and adjust the power applied to the CapDI module via the switching regulator. Accordingly, the process of FIG. 6 can be performed entirely autonomously under control of the controller. In some such examples, the fluid source, CapDI system, and use device can form a closed-loop, automated system in which the CapDI system provides deionized fluid to a use device under the control of the controller, regeneration is initiated and controlled by the controller until complete, and system use is resumed under the control of the controller.

With reference to FIG. 1, some systems include a plurality of inlet lines (113a, 113b) coupled to the CapDI module 102. In some embodiments, one or more of such lines comprises a valve (e.g., 114a, 114b). During a regeneration process, one or more such valves can be opened to, for example, provide a greater volume of fluid flow through the CapDI module 102 for effective regeneration. Valves 114a, 114b can be automatically opened, for example by the controller 172 controlling valve control 170 during an automated regeneration process, and automatically closed when the process is complete.

Embodiments of the CapDI system 100 can be included in various fluid processing systems or standalone machines. For example, a CapDI system 100 can be included as part of a dishmachine, receiving water from the water inlet for the machine and either filling a reservoir 120 within the dishmachine. Moreover, as previously described, arranging a plurality of CapDI cells in series allows for system operation using lower currents, allowing for the use of relatively smaller components and conductors for handling current. In addition, switching regulator 164 as herein described can provide sufficient electrical power for system operation coupled with a variable current limit for feedback adjustment as previously described while remaining sufficiently compact for placement on a control board. The compact power MOSFET polarity circuit 166, such as a power MOSFET H-bridge circuit, operates with the switching regulator 164 to enable bidirectional power application to the CapDI module 102, allowing for purification and regeneration modes of operation. Resultantly, the control board 160 provides robust control of the CapDI system while remaining sufficiently compact to be placed onboard in a use device. In some embodiments, the control board 160 is no larger than four inches by four inches in dimension, and can include fully integrated components for operating a CapDI system.

In some embodiments, the CapDI system 100 can interface with an external controller via communication 174 on control board 160. External controller can act to operate the CapDI system 100 for a particular dedicated operation. Accordingly, external controller can include a memory comprising operating instructions for the controller 172 of the CapDI system 100. For example, in some configurations, the external controller is used in a system requiring water deionized below a threshold particular to the system. Thus, the external controller can define, for example, a conductivity threshold used to dictate operation of the CapDI system. In general, the external system can control any number of operations of the CapDI system 100. In some embodiments, the combination of an external controller and the CapDI controller 172 can combine to provide entirely autonomous operation of a CapDI system 100.

The CapDI system 100 can be further configured to communicate with external memory, for example via communication 174. External memory can be included in, for example, an external system having an external controller. In such configurations, the controller 172 can be configured to read from or write to the external memory. For example, the controller 172 can write data to an external memory regarding measured conductivity, electrical power applied to CapDI module 102, the duration of CapDI module 102 operation, the amount of fluid deionized by CapDI module 102, or any other system data that can be logged in an external memory.

In some embodiments, external memory receives CapDI system operation data from the controller 172 of the CapDI system. External memory can catalog and store CapDI system data for recall. Thus, a user can access past CapDI system data from the external memory for review. In some embodiments, a user can use the stored CapDI system data to analyze system operation over time, or to compare data from one system use to a past use. In other operations, CapDI system data can be recalled by a controller to determine if the system is operating correctly, needs regeneration, or for any other purpose that can be determined by a controller. It will be appreciated that the functionality of external memory as described herein can be embodied in on-board memory on the control board 160 of the CapDI system 100. Such integrated memory can be in communication with controller 172 and/or an external controller via communication 174.

An external controller can interface with external or on-board memory and operate CapDI system 100 accordingly. For example, in some configurations, the controller 172 logs the amount of deionization that has been performed with the CapDI module 102 since the most recent regeneration. This data can include, for example, an amount of fluid that has been deionized, time during which deionization has occurred, or the amount of deionization power that has been applied. In response, regeneration of the CapDI module can be initiated once the amount of deionization has reached a predetermined threshold. The regeneration can be initiated, for example by an external controller or by controller 172 in communication with external or on-board memory.

Various exemplary capacitive deionization systems have been described. Such systems are exemplary in nature and do not limit the scope of the invention in any ways. Various combinations and modifications of the exemplary embodiments described herein may be apparent to those skilled in the art without departing from the scope and spirit of the invention. Some such examples and others are within the scope of the following claims.

The invention claimed is:

1. A method for treating a fluid via a system comprising:
    a fluid inlet;
    a fluid outlet;
    a capacitive deionization (CapDI) module;
    a first fluid outlet valve coupled between the fluid outlet and a use device;
    a second fluid outlet valve coupled between the fluid outlet and a drain;
    a conductivity sensor; and
    a control board comprising:
    a controller in communication with the conductivity sensor;
    a switching regulator coupled to the controller;
    a power MOSFET polarity circuit coupled to the switching regulator; and
    a module connector connected to the CapDI module and coupled to the power MOSFET polarity circuit; the method comprising:
    opening the first fluid outlet valve;
    receiving fluid flowing through the CapDI module;
    applying a first electrical potential to the switching regulator, the first electrical potential being a non-zero electrical potential;
    providing regulated electrical power from the switching regulator to the power MOSFET polarity circuit in response to the applied first electrical potential;
    applying electrical power in a first polarity to the CapDI module from the power MOSFET polarity circuit via the module connector to operate the CapDI module in a purification mode; and
    electrically capturing ions from the fluid in the CapDI module, creating a deionized fluid;
    directing the deionized fluid to the use device through the first fluid outlet valve;
    receiving fluid conductivity information from the conductivity sensor representative of the conductivity of the deionized fluid directed to the use device after passing through the CapDI module comprising a plurality of conductivity measurements over a length of time;
    determining an average of the detected conductivity values based on the received plurality of conductivity measurements;
    comparing the average conductivity value to a conductivity value threshold;
    in the condition that the average conductivity value exceeds the threshold conductivity value, adjusting the first electrical potential applied to the switching regulator to a second electrical potential, greater than the first electrical potential and being a non-zero electrical potential;
    closing the first fluid outlet valve;
    opening the second fluid outlet valve;
    adjusting the power MOSFET polarity circuit, thereby applying electrical power in a second polarity to the CapDI module from the power MOSFET polarity circuit, the second polarity being opposite the first, to operate the CapDI module in a regeneration mode;
    increasing the flow of the fluid flowing through the CapDI module in the regeneration mode compared to the purification mode; and
    directing the fluid from the CapDI module in the regeneration mode to the drain via the fluid outlet and the second fluid outlet valve.

2. The method of claim 1, wherein closing the first fluid outlet valve is performed in response to a detected regeneration condition.

3. The method of claim 1, wherein
    the use device comprises a fill tank for receiving deionized fluid and a fill sensor for detecting the fluid level in the fill tank; and
    the method further comprises:
    in the condition that the fluid level in the fill tank detected by the fill sensor is below a lower fill threshold, actuating the first fluid outlet valve such that deionized fluid flows into the fill tank via the fluid outlet and the first valve;
    in the condition that the fluid level in the fill tank is above an upper fill threshold, closing the first fluid outlet valve; and
    in the condition that the fluid level in the fill tank is between the upper and lower fill thresholds;
    maintaining the status of the first fluid outlet valve.

4. The method of claim 3, wherein
    the fill sensor is in communication with the controller; and
    the first fluid outlet valve comprises a solenoid coupled to a power source in communication with the controller;
    and further comprising:
    receiving a signal from the fill sensor;
    determining if the fluid level in the fill tank is above, below, or between the upper and lower fill threshold; and
    controlling the first fluid outlet valve based on the received signal.

5. The method of claim 3, wherein the fill sensor comprises a first float and a second float, the second float positioned above the first; and wherein
    the position of the first float defines the lower fill threshold and the position of the second float defines the upper fill threshold.

6. The method of claim 1, further comprising:
    in the condition that the average conductivity is lower than the threshold conductivity, adjusting the applied first electrical potential to decrease the regulated electrical power applied from the switching regulator to the MOSFET polarity circuit.

7. The method of claim 1, wherein the fluid inlet comprises a plurality of parallel fluid inlet lines and the capacitive deionization (CapDI) module is in fluid communication with each of the plurality of fluid inlet lines via a corresponding plurality of fluid inlet valves.

8. The method of claim 7, wherein receiving the fluid flowing through the CapDI module comprises opening a first of the plurality of fluid inlet valves to flow the fluid from a first of the plurality of fluid inlet lines through the CapDI module.

9. The method of claim 8, wherein increasing the flow of the fluid flowing through the CapDI module in the regeneration mode comprises opening a second of the plurality of fluid inlet valves to flow fluid from a second of the plurality of fluid inlet lines through the CapDI module.

10. The method of claim 9, wherein increasing the flow rate of the fluid flowing through the CapDI module in the regeneration mode comprises directing fluid from both the first of the plurality of fluid inlet lines and the second of the plurality of fluid inlet lines through the CapDI module to the drain via the second fluid outlet valve.

11. A method for treating a fluid via a system comprising:
a fluid inlet
a fluid outlet;
a capacitive deionization (CapDI) module;
a conductivity sensor; and
a control board comprising:
a controller in communication with the conductivity sensor;
a switching regulator coupled to the controller;
a power MOSFET polarity circuit coupled to the switching regulator; and
a module connector connected to the CapDI module and coupled to the power MOSFET polarity circuit; the method comprising:
receiving fluid flowing through the CapDI module;
applying a first electrical potential to the switching regulator, the first electrical potential being a non-zero electrical potential;
providing regulated electrical power from the switching regulator to the power MOSFET polarity circuit in response to the applied first electrical potential;
applying electrical power in a first polarity to the CapDI module from the power MOSFET polarity circuit via the module connector to operate the CapDI module in a purification mode; and
electrically capturing ions from the fluid in the CapDI module, creating a deionized fluid;
directing the deionized fluid to the use device from the CapDI module;
receiving fluid conductivity information from the conductivity sensor representative of the conductivity of the deionized fluid directed to the use device after flowing through the CapDI module comprising a plurality of conductivity measurements over a length of time;
determining an average of the detected conductivity values based on the received plurality of conductivity measurements;
comparing the average conductivity value to a conductivity value threshold; and
in the condition that the average conductivity value exceeds the threshold conductivity value, adjusting the first electrical potential applied to the switching regulator to a second electrical potential, the second electrical potential being:
the same polarity as the first electrical potential,
a greater magnitude than the first electrical potential, and
a non-zero electrical potential.

12. The method of claim 11, wherein
the system further comprises a first fluid outlet valve coupled between the fluid outlet and a use device and a second fluid outlet valve coupled between the fluid outlet and a drain; and
directing the deionized fluid to the use device from the CapDI module comprises directed the deionized fluid to the use device through the first fluid outlet valve; and
wherein the method further comprises:
closing the first fluid outlet valve;
opening the second fluid outlet valve;
adjusting the power MOSFET polarity circuit, thereby applying electrical power in a second polarity to the CapDI module from the power MOSFET polarity circuit, the second polarity being opposite the first, to operate the CapDI module in a regeneration mode; ands
directing the fluid from the CapDI module in the regeneration mode to the drain via the fluid outlet and the second fluid outlet valve.

\* \* \* \* \*

UNITED STATES PATENT AND TRADEMARK OFFICE
CERTIFICATE OF CORRECTION

| | | |
|---|---|---|
| PATENT NO. | : 11,040,897 B2 | |
| APPLICATION NO. | : 15/059968 | |
| DATED | : June 22, 2021 | |
| INVENTOR(S) | : Kyle Wood | |

It is certified that error appears in the above-identified patent and that said Letters Patent is hereby corrected as shown below:

In the Claims

Column 15, Claim 11, Line 27, delete "inlet" and insert -- inlet; --

Column 16, Claim 12, Line 41, delete "ands" and insert -- and --

Signed and Sealed this
Twenty-third Day of November, 2021

Drew Hirshfeld
*Performing the Functions and Duties of the*
*Under Secretary of Commerce for Intellectual Property and*
*Director of the United States Patent and Trademark Office*